UNITED STATES PATENT OFFICE.

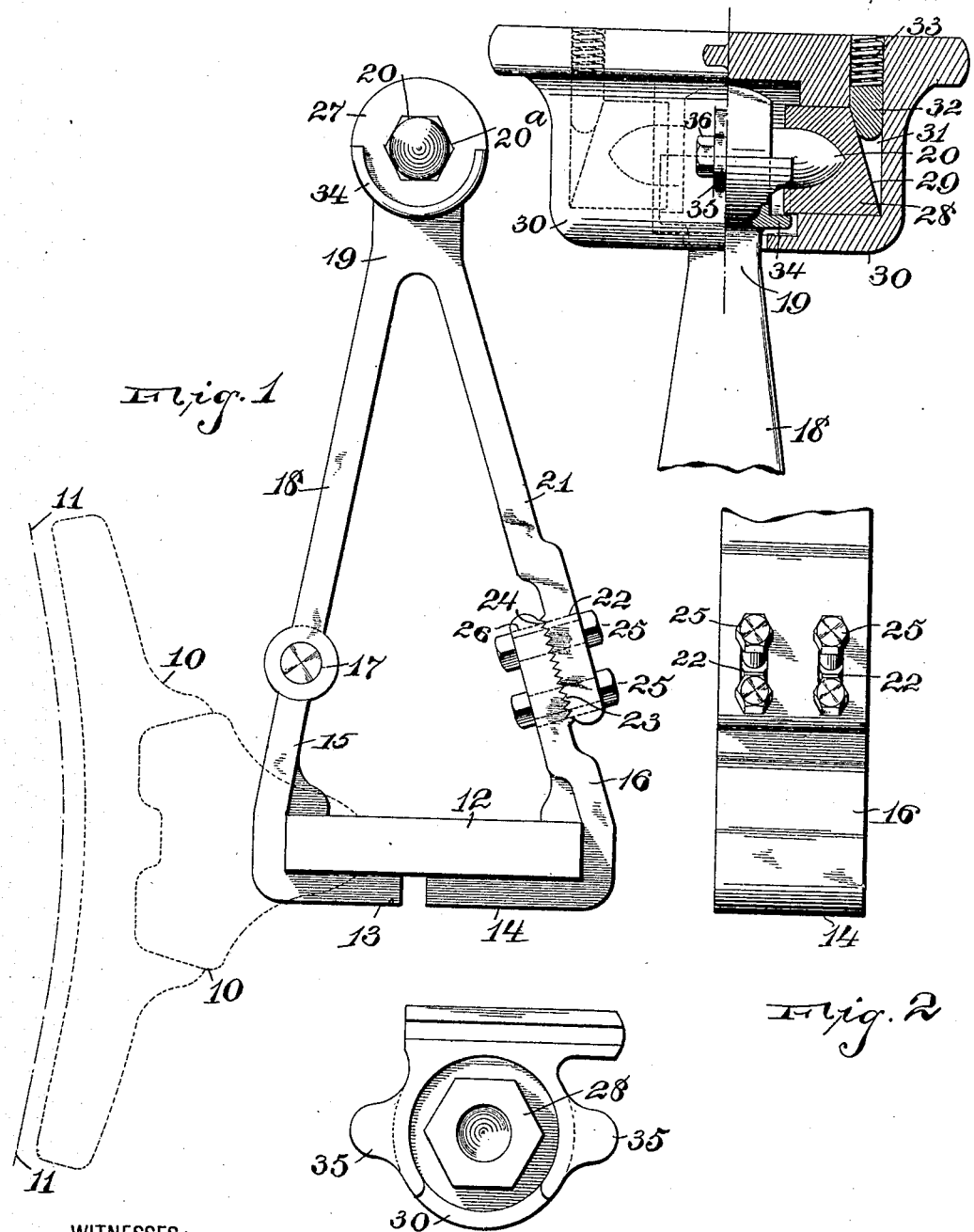

CHARLES H. KNOBBS, OF ELIZABETH, NEW JERSEY, ASSIGNOR OF ONE-THIRD TO IRA R. NELSON, OF NEWARK, NEW JERSEY.

BRAKE-HANGER.

No. 916,453.          Specification of Letters Patent.          Patented March 30, 1909.

Application filed June 4, 1908. Serial No. 436,562.

*To all whom it may concern:*

Be it known that I, CHARLES H. KNOBBS, a citizen of the United States, residing at Elizabeth, in the county of Union and State of New Jersey, have invented certain new and useful Improvements in Brake-Hangers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved hanger for brakes which consists of a hanger adapted to support a brake-shoe so that it can be projected toward and withdrawn from the wheel, the hanger being arranged so as to allow an adjustment of the brake-shoe so that its braking surface will be concentric to the tread of the wheel, or to the surface on which the brake-shoe is adapted to brake.

The brake-hanger consists of an adjustable means for tilting the brake-shoe in its relation to the pivot of the brake-hanger.

A further object of this invention is to provide a bearing for the pivot of the brake-hanger which is adapted to be constantly seated in its place and is not apt to rattle, being kept constantly tightened by the friction of wedges against the bearings to keep them taut.

The invention is illustrated on the accompanying drawing, in which—

Figure 1 is a side view of a brake-hanger showing the brake-shoe in dotted outline. Fig. 2 is a broken view of the hanger at right-angles to Fig. 1, one half the bearing for the brake-hanger being shown in section, and Fig. 3 is a face view of the inner side of one of the brake hanger bearings.

The invention is adapted to use any form of brake-shoe 10, the braking surface of which is adapted to bear on the periphery 11 of a revolving element such as a wheel. With other styles of brake-hangers it is common to have the brake-shoe wear off on one end quicker than the other, or to have it imperfectly made so that one end of the brake-shoe will engage the wheel before the other end does, and the braking is not thorough and sometimes not sufficient to give the operator of a vehicle a ready control.

In my construction I secure the brake-shoe 10 to any suitable form of brake-beam 12, which brake-beam rests on the hook ends 13 and 14 of the plates 15 and 16 respectively. The plate 15 is pivoted as at 17 to one of the arms 18 of the V-shaped suspending member 19, the member 19 having pins 20 which act to suspend the member 19 pivotally at suitable points on a car truck. The member 19 has another arm 21 arranged at an acute angle to the arm 18, the member 21 being slotted as at 22 and having teeth 23, these teeth having registering teeth 24, of the plate 16, so that when the bolts 25 are fastened in place through the slot 22 and the slot 26 in the plate 16, the plate 16 and the arm 21 are held against slipping on each other, and the brake-shoe is held securely in its place. When the bolts 25 are loosened to adjust the plate 16 on the arm 21 and the plate 16 is swung, it turns on the pivot 17, irrespective of the pivotal attachment of the bracket, as a whole, to the car truck. The pins 20, extending out on each side of the hub 27 of the member 19, extend into bearings 28 which are preferably made of an anti-friction or lubricating metal, these bearing blocks having their rear faces 29 beveled as shown in Fig. 2, and the casings 30, inclosing the whole pivotal structure, are provided with ways 31 in which wedges 32 are adapted to slide, being actuated by the springs 33 which bear up against a rigid support, such as the car truck to which the casing 30 is attached. It will thus be seen that as the bearing plates 28 wear away, the wedges 32, acting on the beveled surfaces 29, will tend to constantly center the brake-hanger, and also take up any wear, in this way preventing rattling or any loosening of the bracket in its bearings.

The hub 27 is provided with a semi-circular flange 34 which is adapted to prevent an excess of dust entering into the bearings so as to cause any undue friction of the parts. The bearing plates are preferably made rectangular or hexangular as shown in Fig. 3, fitting in a hole of the same contour, whereby the plates 28 are prevented from turning. The casing 30 is made in halves which are provided with the flanges 35 through which the bolts 36 are placed so that the casing is fastened securely together. The portion of the pin 20 which is inside the hub 27 can be made square or rectangular as shown at 20ª in Fig. 1 so that the pin will not turn in the hub.

Having thus described my invention, what I claim is:—

1. A brake-hanger comprising divergent arms, a pivotal bearing for the hanger, a brake-shoe, means for pivotally supporting the brake-shoe on one of the arms, and means for adjustably securing it to the other arm.

2. A brake-hanger, means for pivotally suspending the brake-hanger, a brake-shoe secured to the hanger, means for tilting the brake-shoe in its relation to the pivot of the hanger, and means for locking the brake-shoe in its different tilted positions.

3. A brake-hanger comprising divergent arms, means for suspending the brake-hanger, a brake-beam, a brake-shoe on the brake-beam, means for securing the brake-beam pivotally on one of the arms, and means for adjustably securing the brake-beam to the other arm.

4. A brake-hanger comprising divergent arms, means for pivotally suspending the hanger, a plate pivotally secured to one arm, a plate longitudinally adjustable on the other arm, and a brake-shoe secured to the plates.

5. A brake-hanger comprising divergent arms, means for pivotally suspending the hanger, a plate pivotally secured to the end of one arm, a plate having a slot therein, the second arm of the hanger having a slot to be placed in register with the slot of the plate, bolts passing through the slots to adjustably secure the plate to the second arm of the hanger, a brake-shoe, and means for attaching the brake-shoe to the plates.

6. A brake-hanger comprising divergent arms, means for pivotally suspending the hanger, a plate pivotally secured to the end of one arm, a hook on the end of the plate, teeth on the end of the second arm, a plate having teeth to register with the teeth of the second arm, the toothed ends of the plate and the arm having slots therein, bolts in the slots to adjustably secure the plate and the arm, a hook on the end of the toothed plate, a brake-beam on the toothed ends of the plates, and a brake-shoe on the brake-beam.

7. A brake-hanger having means for attaching a brake-shoe thereto, a hub on the top of the hanger, pins projecting from opposite sides of the hub, a casing, bearing plates in the casing adapted to receive the pins of the hub, beveled faces on the rear of the bearing plates, and springs bearing on the wedges to force the bearing plates toward each other.

8. A brake-hanger having a brake-shoe secured to its end, a hub on the top end of the brake-hanger, pins projecting from opposite sides of the hub, a casing having rectangular recesses therein, bearing plates to fit the recesses, whereby the bearing plates are prevented from turning, beveled faces on the rear of the bearing plates, wedges bearing on the inside of the casing and on the beveled faces of the bearing plates, springs abutting on the wedges and arranged to force the bearing plates toward each other, and a substantially semi-circular flange on opposite sides of the hub and arranged to register with the casing to form a dust guard.

9. A brake-hanger comprising divergent arms, means for suspending a brake-shoe from the arms, means for adjustably securing the brake-shoe at different angles to the arms, a hub on the brake-hanger, pins on opposite sides of the hub, a casing made in halves, means for securing the halves together, a bearing plate in each half of the casing, means for forcing the bearing plates toward each other, the bearing plates having recesses to receive the pins of the hub, and a substantially semi-circular flange on opposite sides of the hub to engage the casing to form a dust guard.

In testimony, that I claim the foregoing, I have hereunto set my hand this 2nd day of June 1908.

CHARLES H. KNOBBS.

Witnesses:
Wm. H. Camfield,
E. A. Pell.